United States Patent [19]

Slawinski et al.

[11] Patent Number: 5,083,113

[45] Date of Patent: Jan. 21, 1992

[54] INDUCTIVE COUPLED OBJECT IDENTIFICATION SYSTEM AND METHOD

[75] Inventors: Christopher Slawinski, Richardson; Richard A. Houghton, Dallas; George L. Brantingham, Richardson, all of Tex.

[73] Assignee: Texas Instruments Incorporated, Dallas, Tex.

[21] Appl. No.: 472,699

[22] Filed: Jan. 31, 1990

[51] Int. Cl.⁵ .................................................. G08B 3/00
[52] U.S. Cl. ...................................... 340/572; 273/371; 273/58 G; 340/692
[58] Field of Search ................ 340/692, 572; 273/1 E, 273/16 C, 336, 381, 382, 389, 398, 400, 58 G, 371

[56] References Cited

U.S. PATENT DOCUMENTS

| | | | |
|---|---|---|---|
| 3,740,742 | 6/1973 | Thompson et al. | 340/572 |
| 4,272,649 | 6/1981 | Pfeiffer | 273/1 E |
| 4,274,090 | 6/1981 | Cooper | 340/572 |
| 4,274,683 | 6/1981 | Tomoeda | 340/572 |
| 4,375,289 | 3/1983 | Schmall et al. | 273/371 |
| 4,476,459 | 10/1984 | Cooper et al. | 340/572 |
| 4,516,770 | 5/1985 | Brookes et al. | 273/58 G |
| 4,634,975 | 1/1987 | Eccleston et al. | 340/572 |

Primary Examiner—Glen R. Swann, III
Attorney, Agent, or Firm—William E. Hiller; Richard L. Donaldson

[57] ABSTRACT

An inductive coupled object identification system (FIGS. 2a and 2b) uses inductive coupling to detect and identify objects. Each object includes an object resonance circuit (LT/CT) with a unique object resonance frequency. Base electronics (50) includes an inductive-coupling base coil (L1) coupled to an oscillator circuit (60). To detect an object, the oscillator circuit continually sends START pulses to the base coil. When an object is proximate to the base coil, a START pulse is inductively coupled to the object resonance circuit, causing it to resonate at the object resonance frequency. This resonance condition is detected by the oscillator circuit, which outputs an oscillation signal FREQ at the object resonance frequency. Frequency counting logic (70) is used to determine the object resonance frequency, allowing a microcomputer (80) to identify the object. Two embodiments of the object identification system are described: a dynamic embodiment (FIGS. 1a and 1b) in which ball-shaped objects (10) are dropped into a bowl (13) through a single base coil (L1) in the rim of the bowl, and a static embodiment (FIGS. 1c and 1d) in which ring-shaped objects (20) are placed over a post (23) incorporating multiple base coils (L1–L5). For the static embodiment, the multiple base coils are multiplexed by a base coil selector circuit (FIG. 2b, 100).

17 Claims, 7 Drawing Sheets

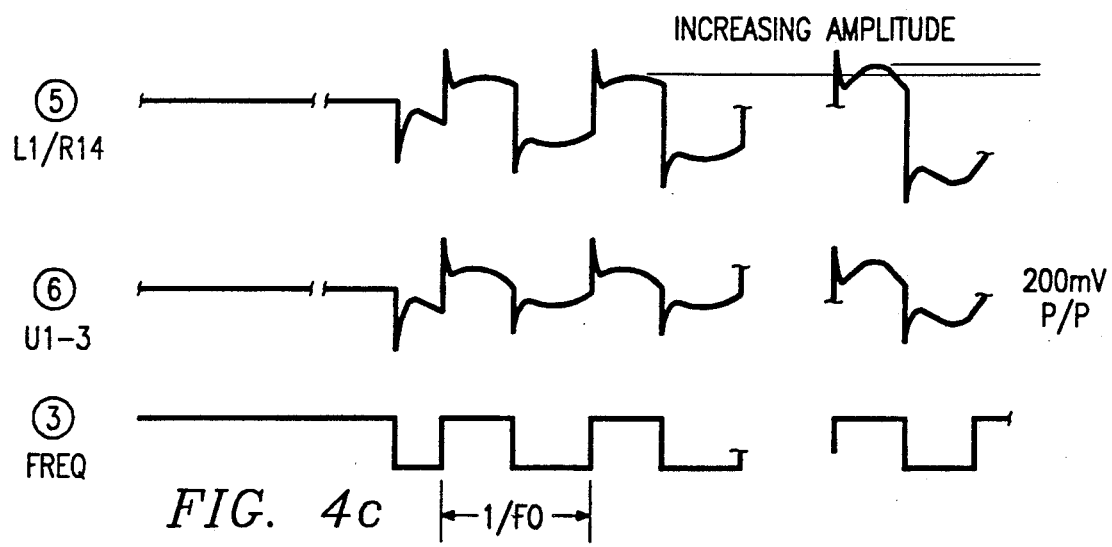
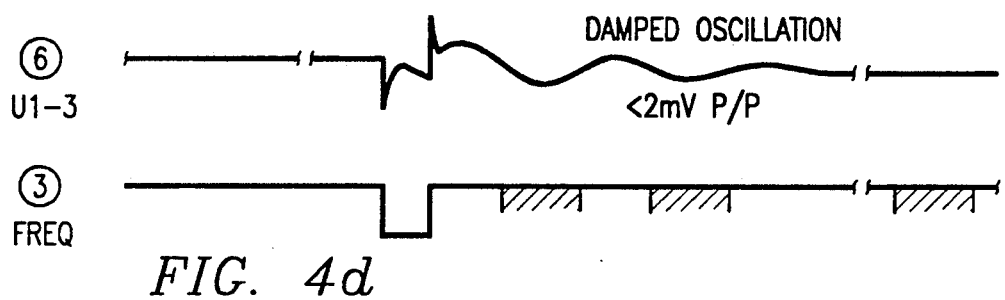
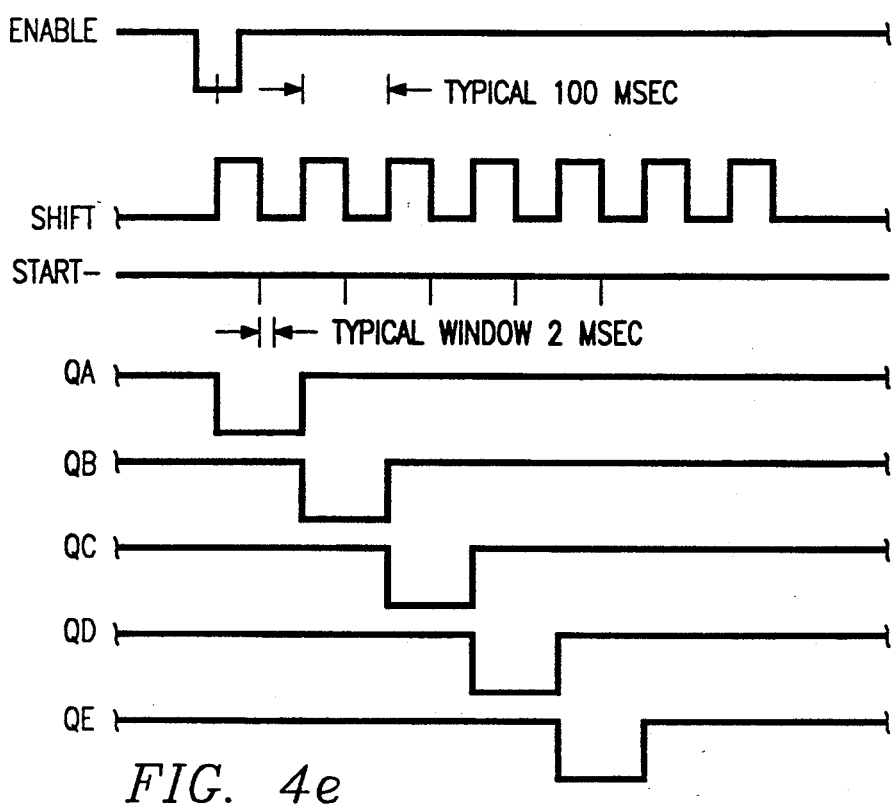

INDUCTIVE COUPLED OBJECT IDENTIFICATION SYSTEM AND METHOD

TECHNICAL FIELD OF THE INVENTION

The present invention relates generally to object identification systems, and more particularly to a system and method using inductive coupling for object identification.

BACKGROUND OF THE INVENTION

Many techniques are available for automatically identifying objects or targets that must be identified as the object is introduced through a detection zone or placed at a selected position. Current techniques include remote tag identification, metal detection, and RF resonance.

Examples of devices that would use an object identification system are games that identify objects, such as balls or rings with predetermined attributes (color letters, numbers, pictures, etc.), as a particular object is (a) introduced into or removed from a container or (b) put into a selected relative position with respect to other objects. Such applications require inexpensive and reliable means of identifying and discriminating between a set of objects using means not connected to the objects.

For such applications, existing object identification techniques are unsatisfactory because complexity, poor object discrimination, or inconvenient proximity relationships between the objects and the identification positions.

Accordingly, a need exists for an inexpensive and reliable device for identifying and descriminating between a set of objects as they are selectively introduced into a container, or as they are arranged in a selected relative position. Preferably, the object identification device would be capable of dynamic operation with moving objects.

SUMMARY OF THE INVENTION

The present invention is an inductive coupled object identification system and method in which objects incorporating resonance circuits with unique resonance frequencies are identified by being inductively coupled to an oscillator circuit for oscillation at the corresponding resonance frequencies.

In one aspect of the invention, an inductive coupled object identification system includes at least one object with an object resonance circuit characterized by a predetermined object resonance frequency unique to that object. A base unit includes an oscillator circuit and at least one inductive coupling circuit used to inductively couple the oscillator circuit to an object resonance circuit when the object resonance and inductive coupling circuits are in a predetermined proximate relationship.

A start circuit provides, at selected intervals, a start signal to the inductive coupling circuit. When an object is sufficiently proximate to an inductive coupling circuit, the start signal is inductively coupled to the object resonance circuit, which resonates at the object resonance frequency.

The oscillator circuit is responsive to a resonance condition in an inductively-coupled object resonance circuit to output an oscillation signal corresponding in frequency to the object resonance frequency. A frequency discrimination circuit is used to determine the frequency of the oscillation signal, which corresponds to the object resonance frequency, allowing the object to be identified.

Preferably, the oscillator circuit comprises a comparator that compares a reference voltage with a feedback voltage, and in response to a resonance condition in an inductively-coupled object resonance circuit, provides an oscillation signal corresponding in frequency to the object resonance frequency. The oscillation signal is coupled to the inductive coupling circuit to sustain the resonance condition, and to the frequency discrimination circuit. Frequency discrimination is accomplished by counting cycles of the oscillation signal output of the comparator over a frequency counting window selected to ensure object identification and differentiation of multiple object resonance frequencies.

Preferably, a computer processor is used to control the start operation, including the generation of start pulses, and the frequency counting operation. Start pulses are provided at intervals corresponding to a processorselected frequency counting window, and the results of successive frequency counting operations are tested to determine the object resonance frequency. The object identification system is readily adaptable to the use of speech synthesis processing in connection with object identification.

In more specific aspects of the invention, twc exemplary embodiments are described—(a) a dynamic embodiment in which a single inductive coupling coil incorporated into the rim of a bowl defines a central opening through which object balls are dropped to achieve inductive coupling, and (b) a static embodiment in which multiple inductive coupling coils are incorporated into a post over which object rings are arranged in a predetermined sequence to achieve inductive coupling. For the dynamic embodiment, each object includes three mutually orthogonal, electrically isolated LC loops such that inductive coupling to the base coil is substantially independent of the object orientation. For the static embodiment, the object identification system includes a base coil selection circuit for sequentially coupling the inductive coupling coils to the oscillator circuit.

The technical advantages of the inductive coupled object identification technique include the following. The technique provides inexpensive and reliable object identification and discrimination. No direct contact between the objects and the base containing the object identification electronics is required. Object identification and discrimination is effected using a proximity relationship between the objects and the base. Using inductive coupling, a significant number of unique targets can be identified and discriminated through the simple expedient of selecting the LC resonance for the object resonance circuit. Object identification can be made dynamic and independent of object orientation. Speech synthesis processing can be used both to control and organize object identification activities and procedures, and to announce object identification results.

BRIEF DESCRIPTION OF THE DRAWINGS

For a more complete understanding of the present invention, and for further features and advantages, reference is now made to the following Detailed Description, taken in conjunction with the accompanying Drawings, in which:

FIGS. 4a-4d are representative waveforms associated with the inductive coupled oscillator circuit—FIG. 4a illustrates START pulse generation, FIG. 4i b illustrates a no-object condition, FIG. 4c illustrates an object-present condition indicated by inductive-coupled oscillation, and FIG. 4d illustrates a condition in which an object is not sufficiently inductively coupled to cause oscillation;

FIG. 4e shows representative waveforms associated with the timing for the base coil selection function.

DETAILED DESCRIPTION OF THE INVENTION

The Detailed Description of exemplary embodiments of the inductive coupled object identification system of the invention is organized as follows:

1. Exemplary Sorter/Stacker Embodiments
 1.1. Sorter Embodiment
 1.2. Stacker Embodiment
2. Functional Description
 2.1. Inductive Coupling and Oscillation
 2.2. Frequency Counting
 2.3. Microcomputer Control
3. Circuit Implementation
 3.1. Oscillator Circuit
 3.2. Base Coil Selection Circuit
 3.3. Frequency Counting Logic
 3.4. Object Circuit Parameters
4. Operation
 4.1. Inductive Coupling and Oscillation
 4.2. Frequency Counting
5. Conclusion The inductive coupled object identification system is described in relation to two exemplary game applications-a Sorter and a Stacker. However, the invention has general application to an object identification system in which an object characterized by a unique object resonance frequency is inductively coupled by an inductive coupling circuit to an oscillator circuit that oscillates at the object resonance frequency when the object is in sufficient proximity. In addition to games, applications for the invention include (a) materials handling routing and sorting, and (b) proximity detection with identification.

1. Exemplary Sorter/Stacker Embodiments

Figure 1A:
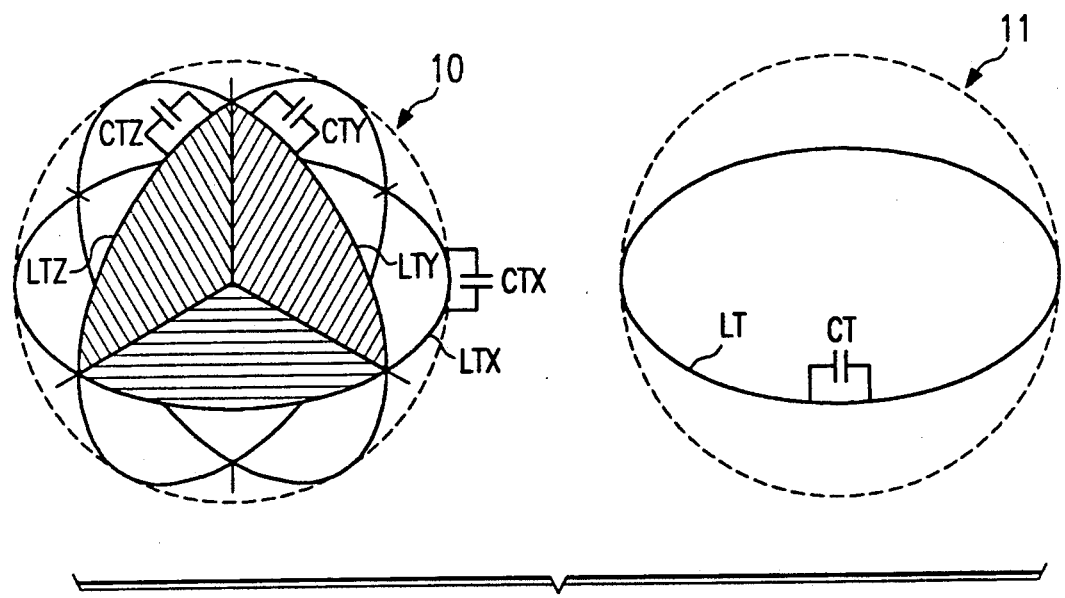
FIGURES 1a and 1b, respectively, illustrate an ball-shaped object and a bowl-shaped base in accordance with an exemplary Sorter application of the object identification technique of the invention.

FIGS. 1aa/1b and 1c/1d respectively illustrate the exemplary Sorter and Stacker embodiments of the inductive coupled object identification system of the invention.

1.1 Sorter Embodiment

Figure 1B:
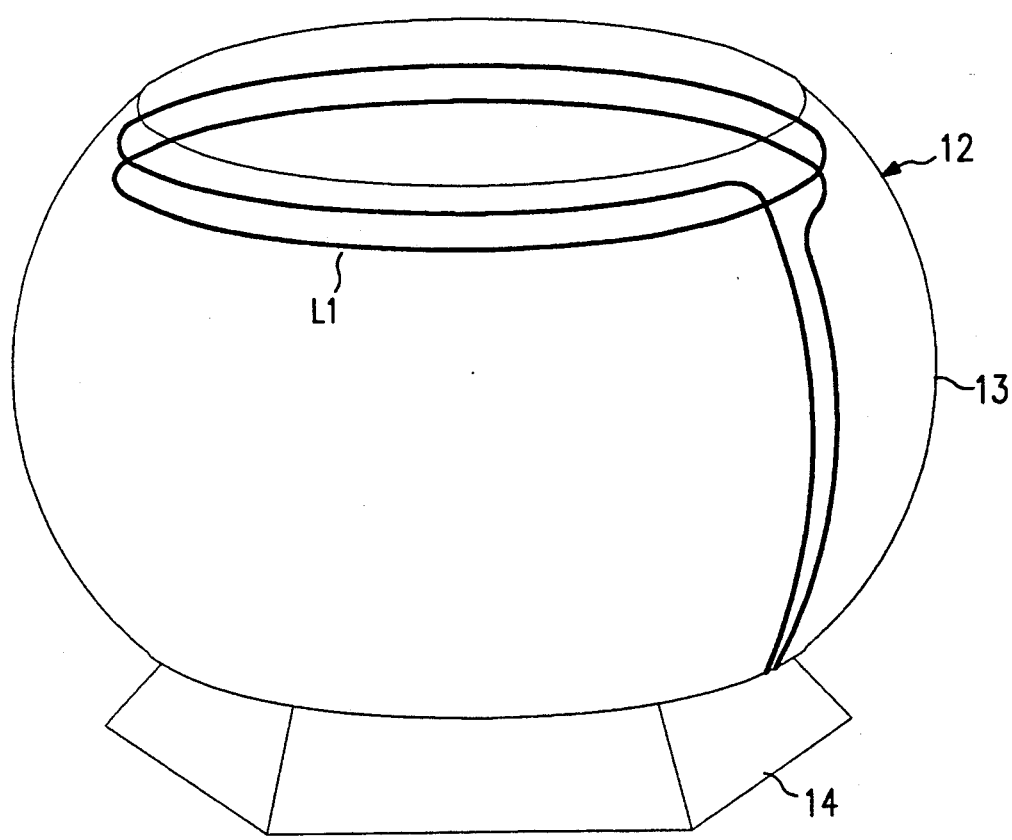

Referring to FIGS. 1a and 1b, for the exemplary Sorter embodiment, the inductive coupled object identification system includes (a) multiple exemplary ball-shaped objects, with alternative implementations being designated 10 and 11, and (b) a base unit 12 having a container or bowl 13 and base electronics 14. The objects must be identified as they are dropped into or removed from bowl 13, requiring that the object identification system operate dynamically.

Each object includes an object resonance circuit comprising at least one inductive coil LT connected in a loop with a corresponding capacitor CT. The LT/CT resonance circuit is configured to resonate at a frequency unique to that object. Object implementation 10 includes three identical LT/CT resonance circuits formed by orthogonal electrically-isolated coils LTX, LTY and LTZ, each with a respective capacitor CTX, CTY and CTZ. Object implementation 11 includes only a single LT/CT circuit.

A single base coil L1 is incorporated into the rim of bowl 13, and is coupled to base electronics 14. Objects dropped into or removed from the bowl pass through base coil L1, and while they are in a predetermined proximate relationship to the base coil, are inductively coupled through L1 to the base electronics.

For the object implementation 10, the three orthogonal object resonance circuits makes inductive coupling to the base coil independent of object orientation. For the object implementation 11, the inductive coupling of the single object coil is sensitive to angular position within the base coil (the coupling is maximum when the coils are parallel, and minimum when the coils are orthogonal).

1.2. Stacker Embodiment

Figure 1C:
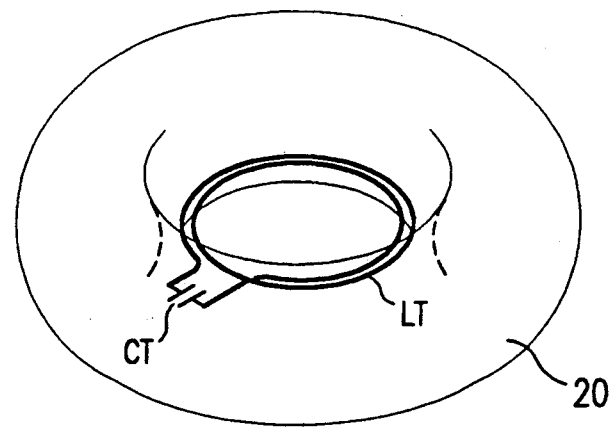
FIGURES 1c and 1d, respectively, illustrate a ring-shaped object and a base with a stacking post incorporating a series of base coils each defining a corresponding object-position on the stack in accordance with an exemplary Stacker application of the object identification technique of the invention.
Figure 1D:
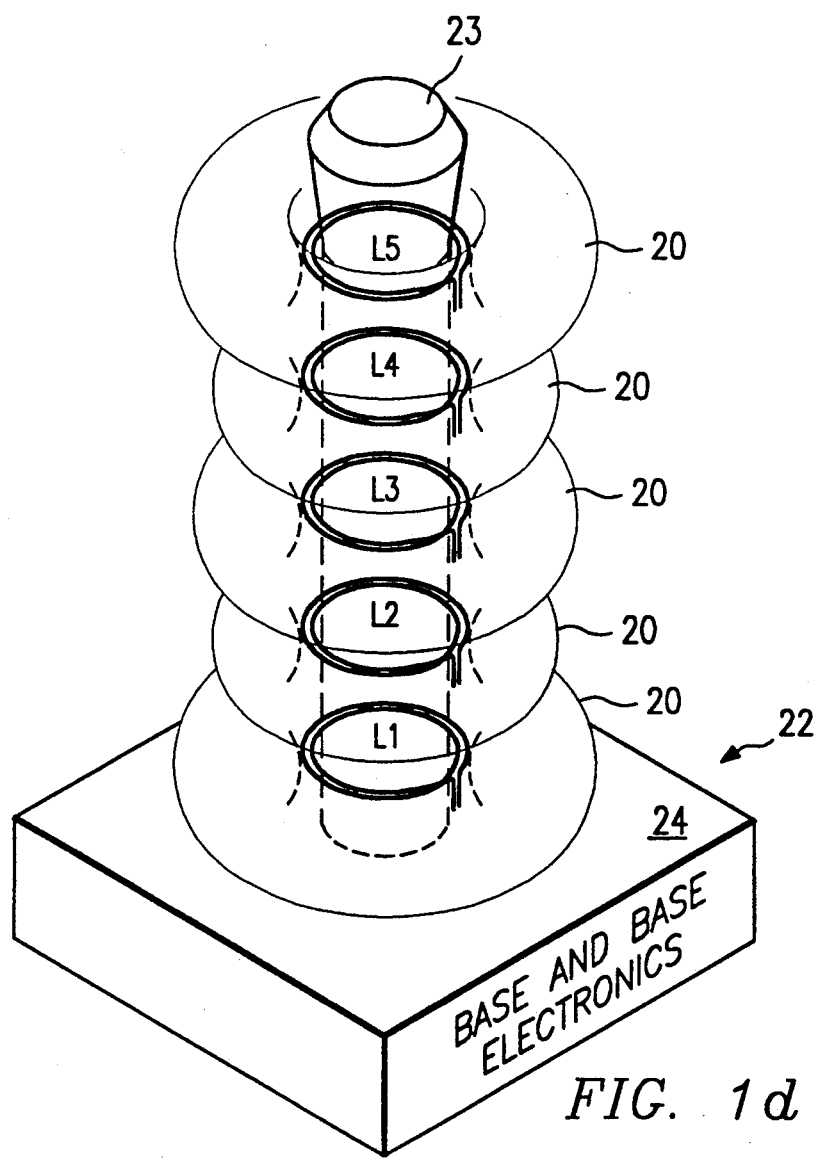

Referring to FIG. 1c and 1d, for the exemplary Stacker embodiment, the inductive coupled object identification system includes (a) multiple ring-shaped objects designated 20, and (b) a base 22 having a post 23 and base electronics 24. The objects must be identified as they are stacked onto or removed from post 13, requiring static identification of objects and their relative position in the stack.

Each ring-shaped object 20 includes an object resonance circuit comprising an inductive coil LT connected in a loop with a corresponding capacitor CT. The LT/CT resonance circuit is configured to resonate at a frequency unique to that object.

Multiple base coils L1-L5 are incorporated into stacking post 23, and are coupled to base electronics 24. Objects stacked onto or removed from the post are concentric with at least one base coil, and are inductively coupled through that base coil to the base electronics (see Section 3). In this manner, the objects and their position on the stack may be identified.

2. Functional Description

Figure 2A:
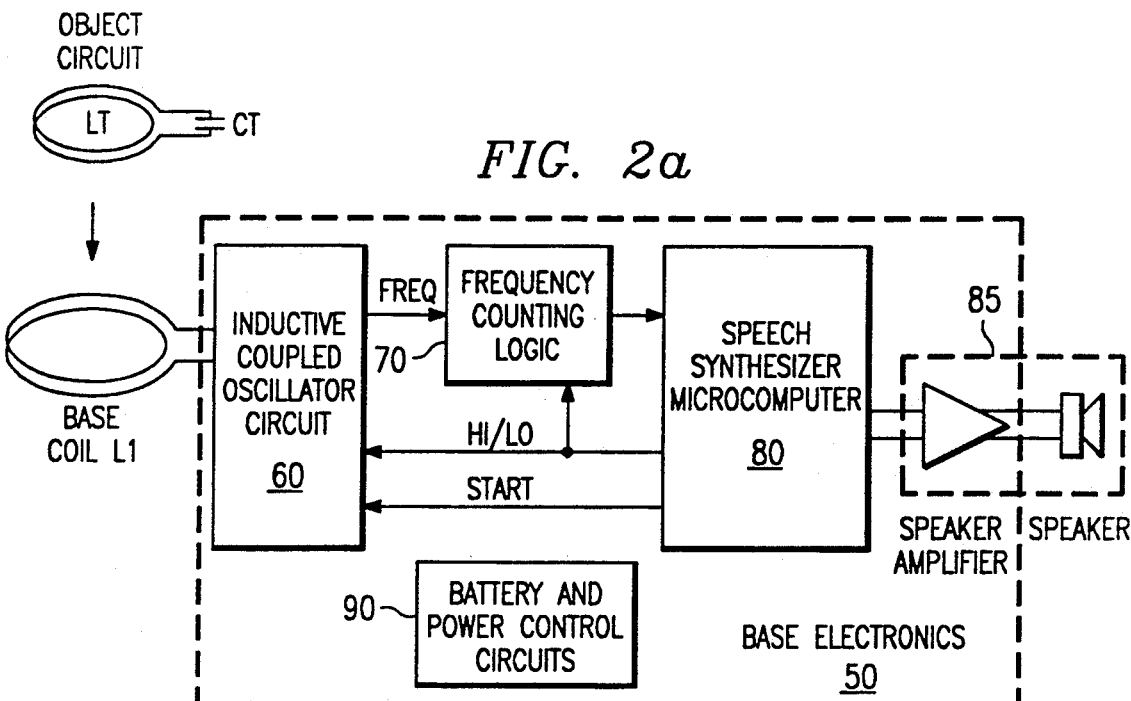
FIGS. 2a and 2b functionally illustrate, respectively, the Sorter and Stacker applications.
Figure 2B:
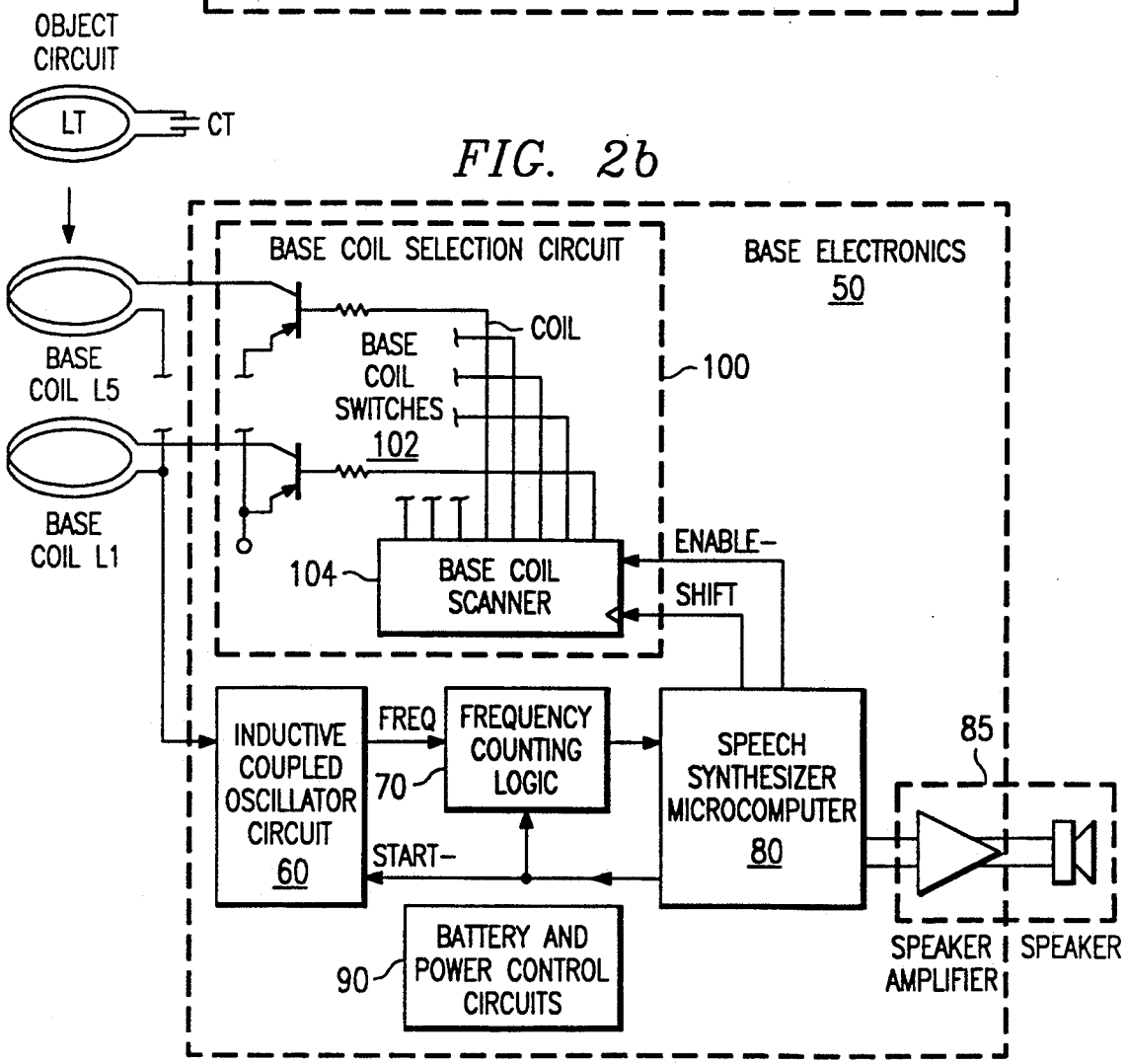

The inductive coupled object identification system of the invention is functionally illustrated in FIG. 2a for the Sorter application, and in FIG. 2b for the Stacker application.

The object identification function—involving detection, inductive-coupled oscillation at the object resonance frequency, and frequency discrimination—is accomplished similarly in both applications, with the principal difference being the use of multiple base coils in the Stacker application, requiring logic to multiplex the base coils. Thus, for both applications, the object identification system includes Base Electronics 50 comprising an Inductive Coupled Oscillator Circuit 60 for object detection and resultant inductive-coupled oscillation, and Frequency Counting Logic 70 for identifying the oscillation frequency (and therefore, the object), with timing and control provided by a Speech Synthesizer Microcomputer 80. In addition, the Base Electronics includes a Speaker/Amplifier 85 and Battery and Power Control Circuits 90.

2.1. Inductive Couplinq and Oscillation

Object detection and identification is accomplished through inductive coupling. When an object is placed or dropped into proximity with the single base coil L1 in the Sorter (FIG. 2a) or one of the multiple base coils L1-L5 in the Stacker (FIG. 2b), the associated LT/CT resonance circuit is inductively coupled through the base coil to Oscillator Circuit 60.

Object detection is controlled by Microcomputer 80, which uses START strobes provided at predetermined intervals to the Oscillator Circuit 60. In response, the Oscillator Circuit generates START pulses that, when an object is sufficiently proximate to a base coil, are coupled through the base coil to the object resonance circuit, inducing resonance at the associated object resonance frequency.

When an object is sufficiently proximate for inductive-coupled resonance, this resonance condition is detected by Oscillator Circuit 60, which oscillates at the associated resonance frequency for that object, generating an FREQ oscillation signal output corresponding in frequency to the object resonance frequency. The FREQ oscillation signal is applied to the base coil to sustain the object resonance condition, and to the Frequency Counting Logic.

For the Sorter (FIG. 2a), Microcomputer 80 also provides a HI/LO command that places the Oscillator Circuit in either a HI or LO energy mode that determines the level of START pulse energy coupled to an object, and establishes low and high frequency bands (permitting an increased number of unique objects). For the Stacker, all object resonance frequencies are contained in a single frequency band.

For the Stacker (FIG. 2b), base coil differentiation is provided by a Base Coil Selection Circuit 100, which includes base coil transistor switches 102 and base coil scanner logic 104. The base coil scanner logic multiplexes the base coils by sequentially activating the associated base coil transistor switches, with base coil scanning being controlled by SHIFT and ENABLE- signals from Microcomputer 80.

2.2. Frecuency Counting

The FREQ oscillation signal output from the Oscillator Circuit is applied to Frequency Counting Logic 70, which performs a conventional frequency counting function. The two exemplary embodiments illustrate two different frequency counting implementations —for the Sorter (FIG. 2a), frequency counting is implemented by Frequency Counting Logic 70 in combination with counter logic in the Microcomputer 80 (see, FIG. 5), while for the Stacker (FIG. 2b), frequency counting is implemented entirely by the separate Frequency Counting Logic.

Microcomputer 80 establishes a frequency counting window during which cycles of the FREQ oscillation signal are counted. The result of the frequency counting operation enables the Microcomputer to determine the frequency of FREQ, i.e., the resonance frequency of the object resonance circuit, thereby identifying the object. For the Stacker embodiment, the Microcomputer also determines the specific base coil associated with the identified object.

2.3. Microcomputer Control

For the exemplary Sorter and Stacker embodiments, Speech Synthesizer Microcomputer 80 is the TSP50C43 Speech Synthesizer available from Texas Instruments, Inc. A design manual and programming guide is available for the TSP50C4X Family of speech synthesizers.

For the inductive coupled object identification system of the invention, the Microcomputer is programmed (a) to provide the START strobes (and HI/LO and SHIFT/ENABLE-) that effect the object detection and inductive-coupled oscillation functions, and (b) to implement the frequency counting and object identification functions. Use of a microcomputer to provide control and processing for the object identification system is exemplary and not critical to the invention—other control techniques (such as a custom chip implementation) could be used.

In addition, the Microcomputer is programmed to implement the Sorter/Stacker applications, including activity organization and speech synthesis.

3. Circuit Implementation

For the exemplary Sorter and Stacker embodiments, this section describes the preferred circuit implementations for the Oscillator Circuit 60, the Base Coil Selection Circuit 100 (Stacker only), and the Frequency Counter Circuit 70. The Speaker/Amplifier 85 and the Battery and Power Control Circuits 90 are routine implementations, and need not be described.

3.1. Oscillator Circuit

Figure 3A:
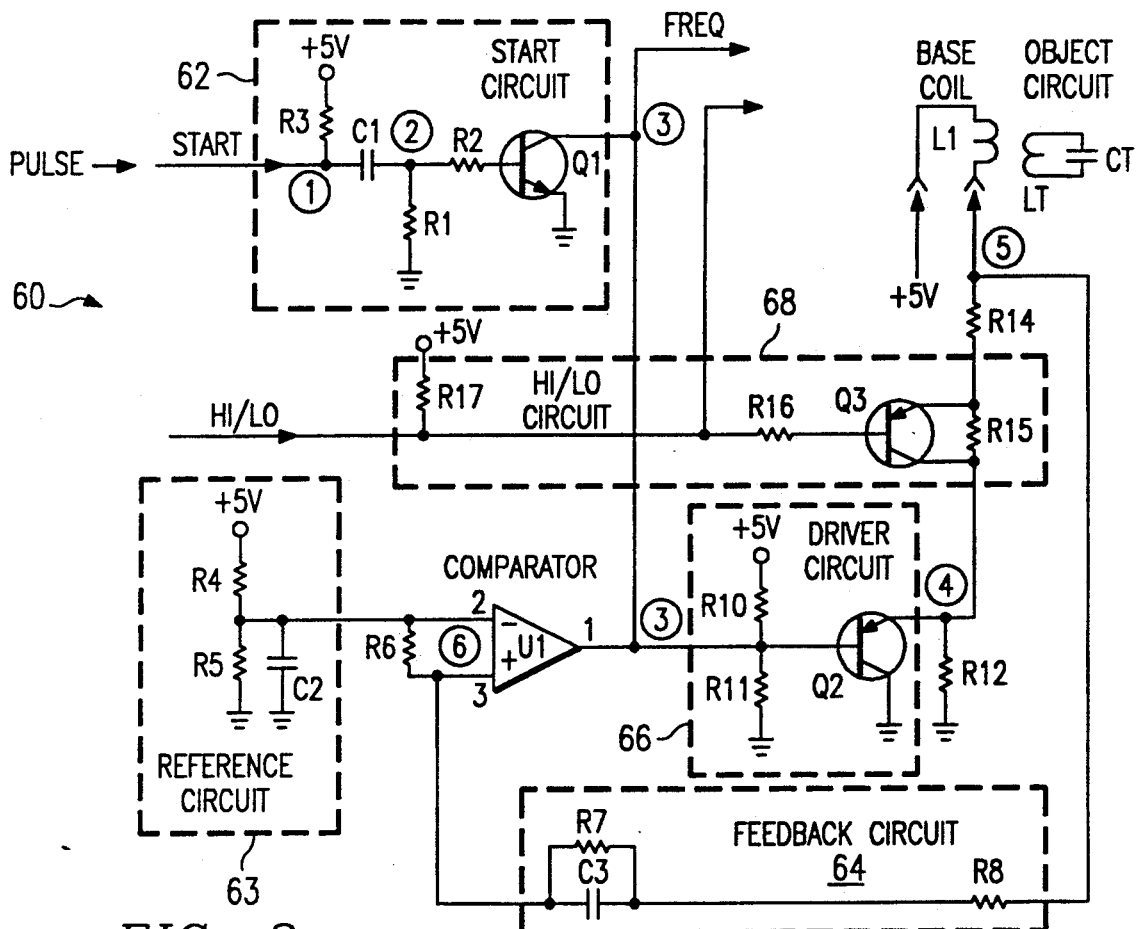
FIGS. 3a and 3b schematically illustrate, respectively, the inductive coupled oscillator circuit for the Sorter and Stacker exemplary embodiments.
Figure 3B:
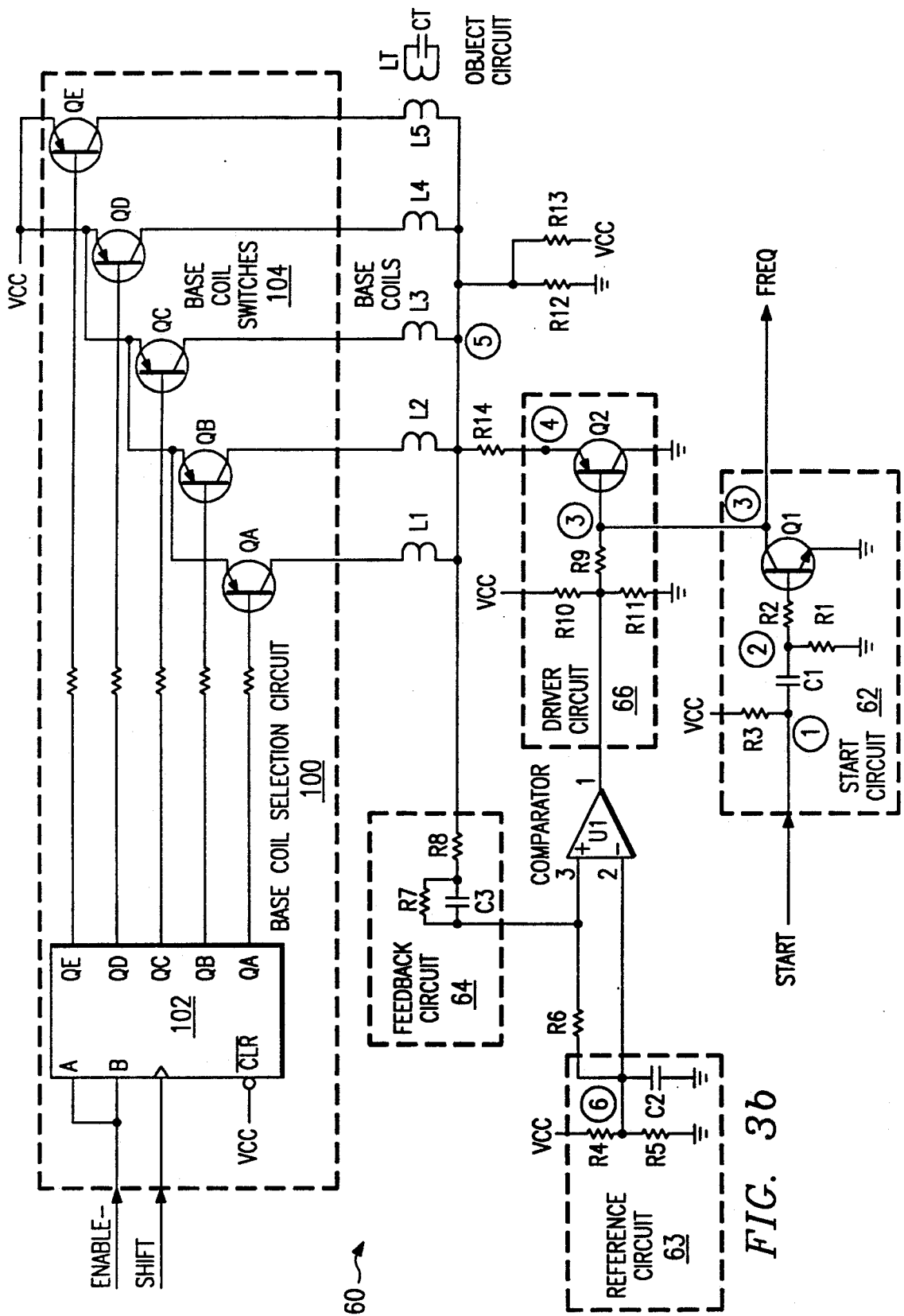

FIG. 3a for the Sorter and FIG. 3b for the Stacker schematically illustrate the Inductive Coupled Oscillator Circuit 60, the configuration of which is substantially alike for both applications.

Oscillator Circuit 60 includes a Start Circuit 62, a Comparator U1 together with associated Reference and Feedback Circuits 63 and 64, and a Driver Circuit 66—in the Sorter embodiment, the Oscillator Circuit also includes a Hi/Lo Circuit 68. When inductively coupled through a base coil to an object resonance circuit, Oscillator Circuit 60 functions as a driven oscillator.

Start Circuit 62 includes an open collector switching transistor Q1. The trailing edge of each START strobe from the Microcomputer (80 in FIGS. 2a and 2b) is AC coupled through a capacitor C1 and through biasing resistors R1/R2 to the base of Q1. The START line is also connected through a pull-up resistor R3 to VCC.

The Comparator U1 has input pins 2 (inverting) and 3 (non-inverting) coupled to the Reference Circuit 63 formed by resistors R4/R5 and a capacitor C2, which provide a reference of about +2.5 V. The non-inverting input U1-3 is also coupled through Feedback Circuit 64, formed by resistors R6, R7 and R8 and a capacitor C3, to an inductive-coupling base coil—either a single base coil for the Sorter (L1 in FIG. 3a) or each of the multiple base coils for the Stacker (L1-L5 in FIG. 3b). The Comparator output U1-1 is an open collector transistor that provides the FREQ oscillation signal output of Oscillator Circuit 60.

Driver Circuit 66 includes a voltage divider R10/R11 and an emitter-follower transistor Q2. Transistor Q2 provides high-impedance unity-gain amplification for the outputs of switching transistor Q1 and the Comparator, which are dot-OR coupled to the base of Q2.

For the Sorter (FIG. 3a), the open collector of switching transistor Q1 and the open collector output of the Comparator are coupled through voltage divider R10/R11 to the base of Q2. For the Stacker (FIG. 3b), the open collector of the switching transistor Q1 is coupled directly to the base of Q2 and through a resistor R9 to voltage divider R10/R11, while the open collector output of the Comparator is coupled through the voltage divider and R9 to the base of Q2. A resistor R12 in the Sorter and resistors R12/R13 in the Stacker provide stability for Q2; stability considerations also account for differences in coupling switching transistor Q1 to amplifier Q2 in the Driver Circuit.

The emitter output of Q2 is coupled through a base coil resistor R14 to an inductive coupling base coil —either the single base coil for the Sorter (L1 in FIG. 3a) or each of the multiple base coils for the Stacker (L1-L5 in FIG. 3b). For the Sorter (FIG. 3a), Ocillator Circuit 60 also includes a Hi/Lo Circuit 68 used to select Hi/Lo inductive-coupling energy modes (i.e., object resonance frequency bands). The Hi/Lo Circuit includes a transistor Q3 having its emitter and collector coupled to respective ends of a base coil resistor R15, which is coupled between the emitter output of Q2 and base coil resistor R14. A HI/LO line from the Microcomputer (80 in FIG. 2a) is coupled through a resistor R16 to the base of Q3 (which is also coupled through a resistor R17 to VCC).

Preferably, Comparator U1 is selected to provide a rapid slew rate and low offset for relatively fast switching. An exemplary Comparator would be No. LM2903 available from Texas Instruments, Inc.

3.2. Base Coil Selection Circuit

Referring to FIG. 3b, for the Stacker application, the inductive coupled object identification system also includes a Base Coil Selection Circuit 100 for multiplexing the multiple inductive-coupling base coils L1-L5 to Oscillator Circuit 60. Selection Circuit 100 includes base coil scanner logic 102 and base coil switches 104.

Each base coil L1-L5 is coupled through a respective transistor switch QA-QE to VCC, with the other end of each base coil being coupled to the Oscillator Circuit. The switches QA-QE are coupled to corresponding outputs QA-QE of base coil scanner logic 102 formed by a shift register. ENABLE- and SHIFT signals from the Microcomputer (80 in FIG. 2b) control shift register scanner, with sequencing being clocked by SHIFT.

An acceptable shift register for use as the base coil scanner would be SN74HC164 available from Texas Instruments, Inc.

3.3. Frequency Counting Logic

With reference to FIGS. 2a and 2b, Frequency Counting Logic 70 receives the oscillation signal FREQ and implements a conventional frequency counting function. For the exemplary Sorter embodiment, the frequency counting function is performed by a composite of HCMOS logic and Speech Synthesizer Microcomputer logic—the speech synthesizer chip selected for the exemplary embodiments (see Section 2.3) includes counter logic that enables the frequency counting function to be implemented partly on-chip. For the exemplary Stacker embodiment, the frequency counting function is performed entirely off-chip in HCMOS.

Figure 5:
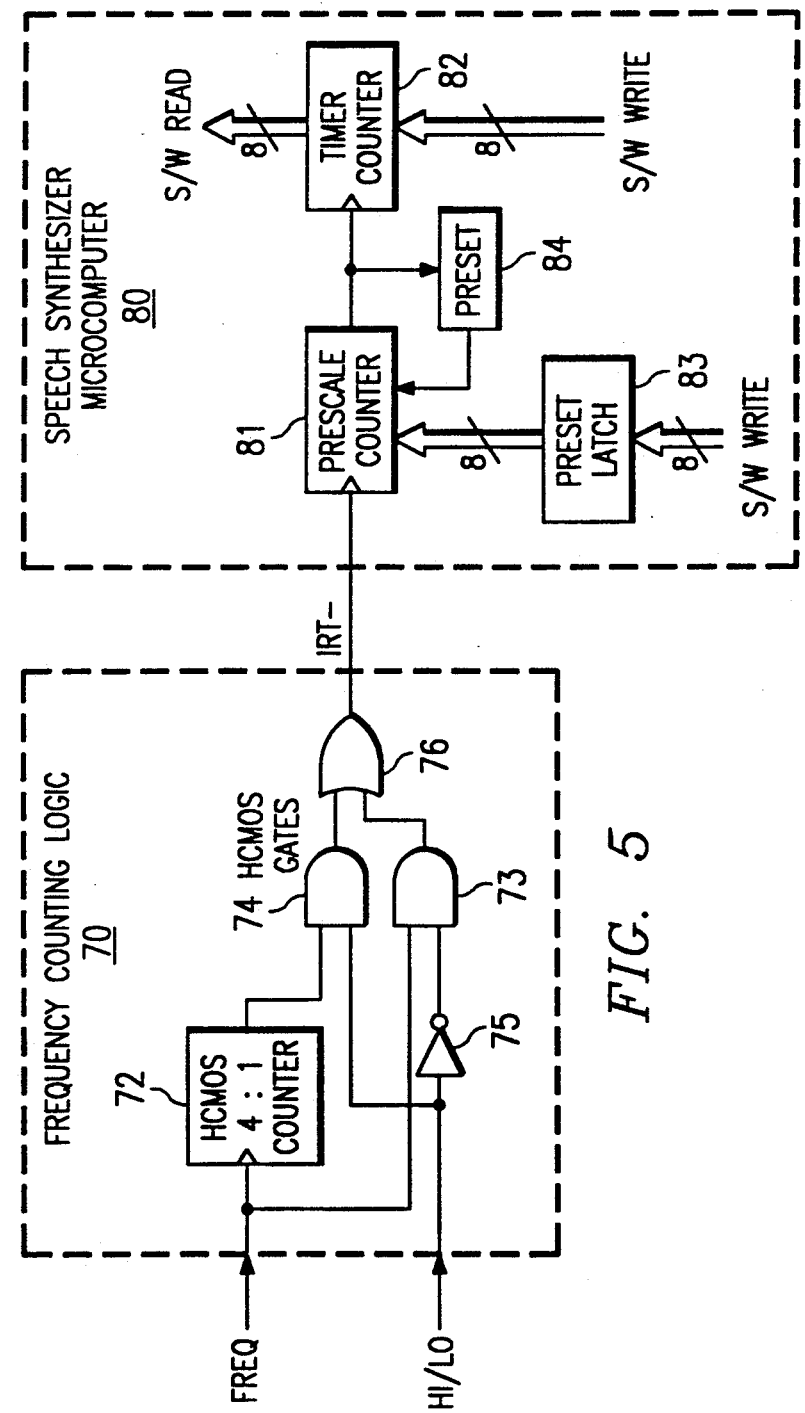
FIG. 5 schematically illustrates the frequency counting and speech synthesizer logic.

For the Sorter, FIG. 5 schematically illustrates the exemplary frequency counting implementation using Frequency Counting Logic 70 in combination with Speech Synthesizer Microcomputer 80. Frequency Counting Logic 70 includes an HCMOS 4:1 counter 72 and associated HCMOS gates that function as a multiplexer controlled by the HI/LO command from the Microcomputer 80. The oscillation signal FREQ from the Oscillator Circuit (60 in FIGS. 2a and 2b) is applied to HCMOS counter 72 and to one input to an AND gate 73; the output of the HCMOS counter is applied to one input to an AND gate 74. The HI/LO command is applied to the other input to AND gate 73, and through an inverter 75 to the other input to AND gate 74. The outputs of the AND gates are input to an OR gate 76.

The output of the OR gate is the output of Frequency Counting Logic 70, and is applied to the IRT- input to Microcomputer 80. Microcomputer 80 includes a software settable prescale counter 81, and a 255:1 timer counter 82, cascaded with the HCMOS counter 72. For the LO inductive-coupling energy mode—the higher frequency band—prescale counter 81 is set to 4:1 by loading a maximum count value of 4 in a preset latch 83. For the HI energy mode—lower frequency band—the prescale counter is set to 1:1 (effectively a bypass) by loading the preset latch with a maximum count value of 1. Wrap-around is controlled by a preset control 84 that detects the end of a count (4 or 1) and effects reloading the maximum count value into prescale counter 81.

For the Stacker, the frequency counting function is performed entirely by separate HCMOS Frequency Counting Logic. A 10 stage counting operation uses three cascaded HCMOS 4:1 counters (not shown)—4 stages in each of the first two counters and 2 of the 4 stages in the third counter.

Thus, the exemplary embodiments illustrate frequency counting implementations that are accomplished either partially or entirely off-chip in special purpose hardware. The specific implementation of the frequency counting function is a design choice that depends primarily on the selection of a Microcomputer for the inductive coupled object identification system, and the assignment of object resonance frequencies. As an alternative to implementing the frequency counting function partially or entirely off-chip, if the selected Microcomputer has sufficient processing power for the frequencies of interest, the frequency counting function can be implemented entirely in the Microcomputer, obviating separate HCMOS Frequency Counting Logic.

As an alternative to a logic implementation of the frequency discrimination function, analog filters and detectors could be used.

3.4. Object Parameters

The object identification technique of the invention depends upon inductively coupling the resonance circuit of an object to the Oscillator Circuit in the Base Electronics. The recommended approach is to use loose coupling (i.e., a coupling coefficient on the order of 0.01–0.1), which tends to put practical object resonance frequencies in a band, limiting their number. If the base-to-object mutual coupling is too tight, the object resonance frequency loses its dependence on CT and LT; if the coupling is too loose, the Oscillator Circuit does not detect the object.

Achieving reliable object identification and discrimination involves design tradeoffs between the number of objects, the expected rate that objects move through the base coil, and the tolerances for the LC components of the object LT/CT circuit and the base coil. Selecting the object resonance frequencies, i.e. the LT/CT component values for each object, requires taking into account the number of objects and component tolerances to achieve resonant frequency separations that ensure object identification and discrimination within design specifications.

The dynamic Sorter application involves special inductive coupling considerations. Dropping objects through the base coil imposes timing constraints on object identification. The frequency counting function requires a minimum frequency counting window to resolve the different object resonance frequencies, while the rate at which the object moves through the base coil provides practical limitations on the time that the object is sufficiently proximate for inductive coupling. Thus, the rate at which objects will move through the base coil inductive-coupling zone must be taken into account in determining the window for resolving frequency differences in the FREQ output from the Oscillator Circuit.

The ideal resonant frequency for the LT and CT values of an object resonant loop is derived from the LC resonance formula $$1/(2*PI*SWR(LT*CT))$$

For the exemplary embodiments, the spacing between object resonance frequencies reflects a +/− 13% total component tolerance in the LT/CT loop. That is, object resonance frequencies were chosen to ensure resolution notwithstanding a worst case 13% error in the inductive and capacitive values for the components in the object circuit.

For the exemplary Sorter application, object parameters are summarized in the table below. This exemplary embodiment uses 16 objects with unique object resonance frequencies in two frequency bands corresponding to two inductive coupling energy modes. In the HI energy mode—low object resonance frequencies—objects 1 through 5 have three orthogonal 1340 microhenry coils (#30 gauge) with 112 turns (about 2 inches in diameter). In the LO energy mode—high object resonance frequencies—objects 6 through 16 have three orthogonal 225 microhenry coils (#30 gauge) with 48 turns (about 2 inches in diameter). The single base coil is 37 microhenrys (#30 gauge) with 12 turns (about 4 inches in diameter).

| Table Of Sorter Objects | | | | |
|---|---|---|---|---|
| Object Number | HI/LO (Energy) | LT (uH) | CT (nFD) | FREQ (hz) |
| 1 | high | 1340 | 82 | 15183 |
| 2 | high | 1340 | 56 | 18372 |
| 3 | high | 1340 | 39 | 22015 |
| 4 | high | 1340 | 27 | 26459 |
| 5 | high | 1340 | 18 | 32406 |
| 6 | low | 225 | 82 | 37052 |
| 7 | low | 225 | 56 | 44836 |
| 8 | low | 225 | 39 | 53727 |
| 9 | low | 225 | 27 | 64572 |
| 10 | low | 225 | 18 | 79084 |
| 11 | low | 225 | 12 | 96858 |
| 12 | low | 225 | 8.2 | 117171 |
| 13 | low | 225 | 5.6 | 141786 |
| 14 | low | 225 | 3.9 | 169901 |
| 15 | low | 225 | 2.7 | 204195 |
| 16 | low | 225 | 1.8 | 250087 |

The frequency resolution window for the HI energy mode is about 10 msec, and for the LO energy mode is about 2.9 msec. For the exemplary Stacker application, object parameters are summarized in the table below. This exemplary embodiment uses 11 objects with unique object resonance frequencies in one frequency band, corresponding to one inductive coupling energy mode. Objects 1 through each have a single 104 microhenry coil (#30 gauge) with turns (about 1.3 inches in diameter). Each of the five base coils (L1-L5 in FIG. 2b) has a single 9 microhenry coil (#30 gauge) with 11 turns (about 1 inch in diameter).

| Table Of Stacker Objects | | |
|---|---|---|
| Object Number | CT (nFD) | F0 (hz) |
| 1 | 82 | 57000 |
| 2 | 56 | 67000 |
| 3 | 39 | 81000 |
| 4 | 27 | 97000 |
| 5 | 18 | 117000 |
| 6 | 12 | 147000 |
| 7 | 8.2 | 171000 |
| 8 | 5.6 | 209000 |
| 9 | 3.9 | 247000 |
| 10 | 2.7 | 303000 |
| 11 | 1.8 | 358000 |

The frequency resolution window is about 2 msec.

The exterior covering of the objects is not critical to the invention, and can be selectively configured in terms of non-metallic materials, dimensions and identifying attributes (such as color, letter, number).

4. Operation

The inductive coupled object identification system of the invention operates similarly for both the Sorter and Stacker exemplary embodiments. The principal operations are (a) object detection and inductive-coupled oscillation, and (b) frequency counting to determine the induced oscillation frequency and identify the object—the Stacker embodiment illustrates multiplexing to differentiate between multiple base coils.

Generally, in response to START strobes from the Microcomputer, the Inductive Coupled Oscillator Circuit pulses the base coil to detect an object resonance circuit in proximity. If the object is close enough, the object resonance circuit is inductively coupled into the Oscillator Circuit, which then oscillates at the resonance frequency determined by the unique LT/CT circuit for the object. This oscillation frequency is coupled to the Frequency Counting Logic, enabling the object resonance frequency to be identified, thereby identifying the object.

4.1. Inductive Coupling and Oscillationg

FIGS. 4a-4d are representative waveforms that illustrate the object detection and inductive-coupled oscillation operations performed primarily by the Oscillator Circuit (60 FIG. 3a and 3b). These waveforms are referenced to corresponding nodes of the Oscillator Circuit.

Figures 4A, 4B:
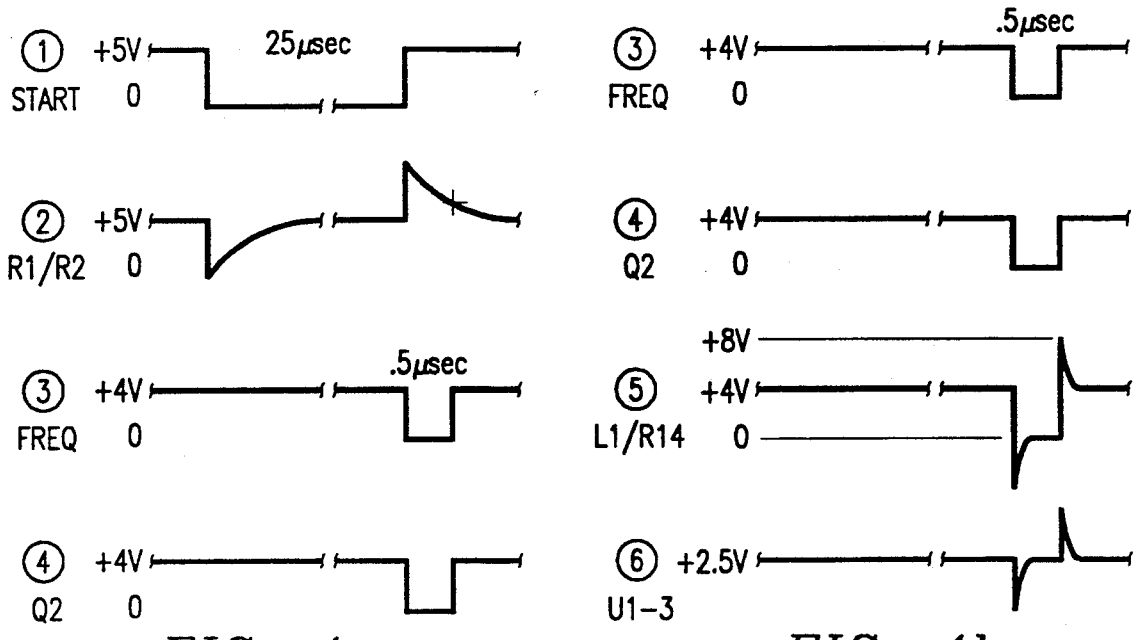

The FIG. 4a waveforms illustrate the generation of START pulses in response to START strobes from the Sorter Microcomputer. Initially, with no object in proximity, the Oscillator Circuit is not oscillating and the signal output FREQ from the Comparator is at a DC logic high (see, waveform 3).

To detect and identify objects as they are brought into proximity to a base coil, the Microcomputer (80 in FIGS. 2a and 2b) applies negative-going START strobes to the START line (waveform 1) at predetermined intervals. The trailing edge of a START strobe is AC coupled through C1, R1 and R2 to switching transistor Q1 (waveform 2), the collector of which is normally pulled high (about +4.3 V) by voltage divider R10/R11. In response, Q1 switches low for a time of about 0.5 microseconds (waveform 3), generating a START pulse of that duration which is applied to Driver Circuit 66.

The FIG. 4b waveforms are obtained when no object is in proximity to a base coil (L1 in FIG. 3a or L1–L5 in FIG. 3b), the START pulse propagates through amplifier Q2 in Driver Circuit 66 (waveform 4) and the base coil resistor(s) R14 (and R15 in the Sorter) to the base coil (waveform 5). This START pulse is fed back through Feedback Circuit 64 to the non-inverting input U1-3 to the Comparator (waveform 6).

In the Feedback Circuit, R8 determines the feedback amplitude, and C3 provides AC coupling of the feedback signal to the Comparator. The AC coupling removes the square wave offset in the feedback signal, and establishes a nominal +2.5 VDC baseline (see, waveform 5). Resistor R6 in the Comparator Reference Circuit gives the oscillator loop a slight bias, so that it rests at the Comparator output DC high when the Oscillator Circuit is not oscillating.

The Comparator output on the FREQ line (which is the output of the Oscillator Circuit) is normally pulled up by the R10/R11 voltage divider. When no object is present, the START pulse propagates through the circuit and no oscillation occurs.

The FIG. 4c waveforms are obtained when an object is brought into proximity to a base coil. A START pulse propagates to the base coil as described above, creating an AC edge that is inductively coupled through the base coil to the object LT/CT circuit (waveform 5). This AC edge induces damped oscillation at the characteristic object resonance frequency in the object circuit, which is coupled back through the base coil and the Feedback Circuit to the Comparator (waveform 6).

If the damped oscillation feedback signal is of sufficient amplitude, the Comparator converts the damped oscillation to driven oscillation, generating a square-wave oscillation signal output FREQ at the object resonance frequency (waveform 3). The Comparator operates in the non-inverting mode to provide the regenerative gain necessary for oscillation. Moreover, the Oscillator Circuit exhibits a capture effect in that the feedback amplitude required to start oscillation is significantly less than the amplitude reached in driven oscillation.

The FIG. 4d waveforms illustrate the case where an object is not sufficiently coupled to cause oscillation, such as when the object is coming into or going out of proximity to a base coil. Thus, if the object resonance signal fed back from the object circuit and input to the Comparator (waveform 6) is so damped that the Comparator does not switch peak-to-peak amplitude less than 2 millivolts), then the Comparator output FREQ remains at DC logic high.

The HI/LO inductive-coupling modes in the Sorter embodiment (FIG. 3a) operate as follows. In response to HI/LO commands from the Microcomputer, the HI/LO Circuit controls inductive-coupled energy by configuring the Oscillator Circuit for HI and LO inductive coupling modes associated with, respectively, low and high object reference frequency bands. If the HI/LO command is HI (logic level low), Q3 in the Hi/Lo Circuit is turned on, bypassing base coil resistor R15 and limiting base coil resistance to R14—as a result, a HI level of energy in each START pulse is inductively coupled to an object resonance circuit. If the HI/LO logic level is LO (logic level high), Q3 is turned off, and the base coil resistance is R11+R12—as a result, a LO level of energy in each START pulse is inductively coupled. Thus, the HI/LO Circuit allows oscillation in the Oscillator Circuit to be driven at two energy levels.

The selection of base coils in the Stacker embodiment (FIG. 3b) operates as follows. In response to SHIFT and ENABLE- signals from the Microcomputer, the Base Selection Circuit sequentially couples one of the multiple base coils L2–L5 into the Oscillator Circuit through an associated base coil transistor switch. During that time, the Oscillator Circuit operates like a single base coil configuration, as in the Sorter.

The FIG. 4e waveforms illustrate the timing of the base coil scanning operation. To begin the operation, the Microcomputer provides a scan sequence pulse on the ENABLE-line and a SHIFT clock signal, which are input to the base coil scanner (shift register 102 in FIG. 3b). The first rising edge of the SHIFT clock that coincides with the enabling scan sequence pulse causes the QA output of the shift register scanner to switch low, turning on the associated base coil switching transistor QA. The next rising edge of the SHIFT clock causes the QA output to switch high and the QB output to switch low, turning off base coil switching transistor QA and turning on base coil switching transistor QB. Continuing the scan, clocked by SHIFT, the shift register outputs QA–QE are switched in sequence, correspondingly switching on the associated base coil switching transistors.

During each interval in which a base coil switching transistor is on, and an associated base coil is coupled to the Oscillator Circuit, the Microcomputer applies a START-strobe to the Oscillator Circuit, generating a START pulse that propagates to the activated base coil. For the exemplary embodiment, a SHIFT clock period of about 100 msec is used, which allows for a START-pulse-initiated window duration of about 2 msec.

4.2. Frequency Counting

The frequency counting operation uses appropriate counter strings during a predetermined frequency counting window, together with software in the Microcomputer, to determine the frequency of the FREQ oscillation signal, thereby identifying the object by its unique object resonance frequency. The specifics of this conventional frequency counting operation depend on the implementation chosen for the frequency counting function, and two exemplary frequency counting implementations have been described (Section 3.3).

The principal design parameter to be considered in implementing the frequency counting operation is establishing the frequency counting window. This window is chosen to ensure that the different object resonance frequencies can be resolved, i.e., the window must be chosen to permit discrimination between the smallest frequency difference expected.

For the exemplary dynamic Sorter embodiment, referring to the Table of Sorter Objects in Section 3.4, the worst case frequency differences are between objects 1 and 2 in the LO energy mode and between objects 6 and 7 in the HI energy mode. Using a 13% LC component tolerence factor, the LO energy mode would require about a 1 msec window and 2.9 msec is used, while the HI energy mode would require about a 6.4 msec window and 10 msec is used.

For the exemplary static Stacker embodiment, referring to the Table of Stacker Objects in Section 3.4, the worst case frequency difference is between objects 1 and 2. Using the 13% LC component tolerence factor, a window of about 0.5 msec would be required and 2 msec is used.

A frequency counting operation is commenced when the Microcomputer applies an object-detection START strobe to the Oscillator Circuit, initiating oscillation when an object is in proximity to a base coil. The resultant oscillation signal FREQ is applied to the Frequency Counter Circuit to initiate a frequency counting operation.

At the end of a frequency counting window, the Microcomputer reads a binary value corresponding to the number of cycles of the FREQ oscillator signal from the appropriate counter—for the Sorter, the Microcomputer timer counter (82 in FIG. 5), and for the Stacker, the contents of the HCMOS counter in the Frequency Counting Logic (70 in FIG. 3b). The Microcomputer also resets counters in preparation for the next frequency counting operation, except that, for the Sorter, the first stage HCMOS counter need not be reset because the frequency counting operation is not sensitive to its initial count at the beginning of a frequency counting window. The Microcomputer implements this reset operation internally for the Sorter, and with the START strobe for the Stacker.

For the exemplary embodiments, the preferred technique for object identification is to use a series of frequency counting operations for each object identification event, typically by providing a START strobe as soon as a frequency counting window ends. For the dynamic Sorter embodiment, a falling object will typically be sufficiently proximate to the base coil to achieve and sustain oscillation for an interval of about 10 frequency counting windows. For the static Stacker embodiment, referring to the waveforms in FIG. 4e, START strobes will typically be provided every 2 msec for the second half of each 100 msec SHIFT clock cycle (about 50 per base coil selection interval). The actual frequency count will typically be determined by selecting the highest of the multiple frequency counts. Delimiting the frequency counting window using START strobes or pulses is a matter of convenience the only design constraint is that a number of FREQ cycles sufficient for frequency discrimination and object identification be included in the window.

5.0 Conclusion

The inductive coupled object identification technique of the invention allows objects characterized by a unique object resonance frequency to be identified using an oscillator circuit that oscillates at the object resonance frequency when the object is sufficiently proximate to a base coil to be inductively coupled to the oscillator circuit. The technique is adaptable to microcomputer control, with the microcomputer being used to initiate object detection events with START strobes, to establish frequency counting windows, and to determine oscillation signal frequency (i.e., object resonance frequency). The technique is adaptable to either dynamic or static operation.

The technique has general applicability to object identification applications, including games, materials handling and proximity detection. For example, in addition to the exemplary Sorter and Stacker applications, electronic game applications for the technique include include: (a) Electronic board games—movable game pieces as objects, with board positions as base coils; (b) Activity center toys—movable character pieces as objects, with base scene locations as base coils; (c) Stamp activities—rubber stamps as objects, with base coils under blank paper; (d) Collectable plastic cups—character cups with object circuits, with base coil in corresponding bases that respond with synthesized speech appropriate for the character.

Although the present invention has been described with respect to a specific, preferred embodiment, various changes and modifications may be suggested to one skilled in the art, and it is intended that the present invention encompass such changes and modifications as fall within the scope of the appended claims.

What is claimed is:

1. An inductive coupled object identification system, comprising:
   at least one object including an object resonance circuit having a predetermined object resonance frequency unique to said at least one object;
   a base unit comprising at least one inductive coupling circuit and an oscillator circuit;
   computer processor means for initiating an intermittent start signal as a series of pulses at preselected intervals corresponding to a predetermined frequency for reception by said at least one inductive coupling circuit to activate said at least one inductive coupling circuit;
   the object resonance circuit of said at least one object being inductively coupled to the start signal and resonating at the predetermined object resonance frequency unique to said at least one object in response to the placement of said at least one object in a predetermined proximate relationship with respect to said at least one inductive coupling circuit when activated;
   said oscillator circuit being responsive to a resonance condition in an inductively coupled object resonance circuit to provide an oscillation signal corresponding in frequency to the object resonance frequency as an output; and
   a frequency discrimination circuit responsive to the oscillation signal as output from said oscillator circuit for determining the frequency of the oscillation signal, thereby determining the object resonance frequency and identifying said object.

2. An object identification system as set forth in claim 1, wherein said base unit further includes a body having an opening; and
   said inductive coupling circuit comprising an inductive coupling coil defining a central opening therethrough and disposed in registration with the opening provided in said body;

the introduction of said object through the central opening of said inductive coupling coil and the opening in said body providing the predetermined proximate relationship between said object and said inductive coupling coil.

3. An object identification system as set forth in claim 2, wherein said body is a bowl and said object is a ball.

4. An object identification system as set forth in claim 1, wherein said computer processor means includes means for providing a selected frequency counting window;

the preselected intervals between successive pulses in the pulse series comprising the intermittent start signal corresponding to the frequency counting window; and the frequency counting window being selected such that at least a minimum number of cycles of an oscillation signal from said oscillation circuit in response to a resonance condition in an inductively coupled object resonance circuit are provided to said frequency discrimination circuit sufficient to ensure object identification and differentiation of multiple object resonance frequencies.

5. An object identification system as set forth in claim 4, wherein said frequency discrimination circuit includes frequency counting logic elements; and said computer processor means including means for controlling said frequency counting logic elements of said frequency discrimination circuit relating to the frequency counting window during which cycles of the oscillation signal from said oscillator circuit are counted to determine oscillation frequency.

6. An inductive coupled object identification system, comprising:

a plurality of objects, each object including an object resonance circuit having a predetermined object resonance frequency unique to the particular object corresponding thereto;

a base unit comprising at least one inductive coupling circuit and an oscillator circuit;

computer processor means for providing strobe pulses to initiate an intermittent start signal;

a start circuit operably connected to said computer processor means and responsive to the strobe pulses from said computer processor means for generating the intermittent start signal as a series of pulses at preselected intervals as controlled by said computer processor means and corresponding to a predetermined frequency;

said at least one inductive coupling circuit being disposed in operable relation to said start circuit and being activated in response to receiving the series of pulses of the generated intermittent start signal from said start circuit;

the object resonance circuit of an object being inductively coupled to the start signal and resonating at the predetermined object resonance frequency unique to said object in response to the placement of said object in a predetermined proximate relationship with respect to said at least one inductive coupling circuit when activated by said series of pulses provided from said start circuit;

said oscillator circuit being responsive to a resonance condition in an inductively coupled object resonance circuit to provide an oscillation signal corresponding in frequency to the object resonance frequency as an output; and a frequency discrimination circuit responsive to the oscillation signal as output from said oscillator circuit for determining the frequency of the oscillation signal, thereby determining the object resonance frequency and identifying the particular object from the plurality of objects which was placed in the predetermined proximate relationship with respecd to said at least one inductive coupling circuit when activated.

7. An object identification system as set forth in claim 6, wherein said base unit further includes a body having an opening; and said inductive coupling circuit comprising an inductive coupling coil defining a central opening therethrough and disposed in registration with the opening provided in said body;

the introduction of said object through the central opening of said inductive coupling coil and the opening in said body providing the predetermined proximate relationship between said object and said inductive coupling coil.

8. An inductive coupled object identification system, comprising:

a plurality of objects, each object including an object resonance circuit corresponding thereto and having a predetermined object resonance frequency unique to that object;

a base unit comprising a plurality of inductive coupling circuits and an oscillator circuit;

computer processor means for providing strobe pulses to initiate an intermittent start signal;

a start circuit operably connected to said computer processor means and responsive to the strobe pulses from said computer processor means for generating the intermittent start signal as a series of pulses at preselected intervals as controlled by said computer processor means and corresponding to a predetermined frequency;

at least one of said plurality of inductive cuopling circuits being selected to receive a start signal form said start circuit to activate said at least one inductive coupling element;

the object resonance circuit of an object being inductively coupled to the start signal and resonating at the predetermined object resonance frequency unique to said object inr esponse to the placement of that particular object in a predetermined proximate relationship with respect to said selected inductive coupling circuit when activated;

said oscillator circuit being responsive to a resonance condition in an inductively coupled object resonance circuit to provide an oscillation signal corresponding in frequency to the object resonance frequency as an output; and a frequency discrimination circuit connected to said oscillator circuit and receiving the oscillation signal output therefrom for determining the frequency of the oscillation signal, thereby determining the object resonance frequency and identifying the particular object from the plurality of objects which was placed in the predetermined proximate relationship with respect to the selected inductive coupling circuit when activated.

9. An object identification system as set forth in claim 8, further including multiplexing means operably connected to said plurality of inductive coupling circuits for cyclically selecting respective ones of said plurality of inductive coupling circuits to receive the start signal from said start circuit in a predetermined sequence.

10. An object identification system as set forth in claim 9, wherein the output of said frequency discrimination circuit and the status of said multiplexing means are received by said computer processor means for identifying the particular object and the particular one of said plurality of inductive coupling circuits to which the particular object was placed in the predetermined proximate relationship.

11. An inductive coupled object identification system, comprising:

at least one object including an object resonance circuit having a predetermined object resonance frequency unique to said at least one object;

a base unit comprising at last one inductive coupling circuit and an oscillator circuit;

computer processor means for initiating an intermittent start signal as a series of pulses at preselected intervals corresponding to a predetermined frequency for reception by said at least one inductive coupling circuit to activate said at least one inductive coupling circuit;

said computer processor means including mode selection means for providing respective first and second mode control signals to determine the level of the pulse energy included in the pulse series comprising the intermittent start signal as between a first "high" energy mode corresponding to said first mode control signal and a second "low" energy mode corresponding to said second mode control signal;

said inductive coupling circuit being alternatively operable in said "high" energy mode and said "low" energy mode in ersponse to receiving one of said first and second mode control signals from said mode selection means of said computer processor means;

the object resonance circuit of said at least one object being indutively coupled to the start signal and resonating at the predetermined object resonance frequency unique to said at least one object in response to the placement of said at least one object in a predetermined proximate relationship with respect to said at least one inductive coupling circuit when activated;

the status of the inductive coupling circuit in one of the "high" energy mdoe and the "low" energy mode being determinative of the level of start pulse energy coupled to the object resonance circuit of an object placed in the predetermined proximate relationship with respect to said inductive coupling circuit for establishing low and high frequency bands such that the predetermined object resonance frequency at which the object resonance circuit of an object resonates is located in one of the low and high frequency bands;

said oscillator circuit being responsive to a resonance condition in an inductively coupled object resonance circuit to provide an oscillation signal corresponding in frequency to the object resonance frequency as an output; and a frequency discrimination circuit responsive to the oscillation signal as output from said oscillator circuit for determining the frequency of the oscillation signal, thereby determining the object resonance frequency and identifying said object.

12. An inductive coupled object identification system, comprising:

a plurality of objects, each object including an object resonance circuit having a predetermined object resonance frequency unique to the particular object corresponding thereto;

a base unit comprising at least one inductive coupling circuit and an oscillator circuit, said base unit including a body having an opening;

said inductive coupling circuit comprising an inductive coupling coil defining a central opening therethrough and disposed in registration with the opening provided in said body;

computer processor means for providing strobe pulses to initiate an intermittent start signal;

a start circuit operably connected to said computer processor means and responsive to the strobe pulses from said computer processor means for generating the intermittent start signal as a series of pulses at preselected intervals as controlled by said computer processor means and corresponding to a predetermined frequency;

said computer processor means including mode selection means for providing respective first and second mode control signals to determine the level of the pulse energy included in the pulse series comprising the intermittent start signal as between a first "high" energy mode coersponding to said first mode control signal and a second "low" energy mode corresponding to said second mode control signal;

said inductive coupling coil being disposed in operable relation to said start circuit and being activated in response to receiving the series of pulses of the generated intermittent start signal from said start circuit;

said inductive coupling coil being alternatively operable in siad "high" energy mode and said "low" energy mode in response to receiving one of said first and second mode control signals from said mode selection means of said computer processor means;

the object resonance circuit of an object being inductively coupled to the start signal and resonating at the predetermined object resonance frequency unique to said object in response to the introduction of said object through the central opening of said inductive coupling coil and the opening in said body placing the object in a predetermined proximate relationship with respect to said inductive coupling coil when activated by said series of pulses provided from said start circuit;

said plurality of objects being divided into two object grups, the object resonance circuits of the objects included in one object group being effective to resonate at their respective predetermined object resonance frequencies upon an object in said one object group being introduced through the central opening of said inductive coupling coil when the inductive coupling coil is activated in he "high" energy mode, and the object resonance circuits of the objects included in the other object group being effective to resonate at their respective predetermined object resonance frequencies upon an object in said other object group being introduced through the central opening of said inductive coupling coil when the inductive coupling coil is activated in the "low" energy mode;

said oscillator circuit being responsive to a resonance condition in an inductively coupled object rseonance circuit to provide an oscillation signal corresponding in frequency to the object resonance frequency as an output; and a frequency discrimination circuit connected to said oscillator circuit and receiving the oscillation signal therefrom for determining the frequency of the oscillation signal, thereby determining the object resonance frequency and identifying the particular object from the plurality of objects which was placed in the predetermined proximate relationship with respect to said inductive coupling coil when activated.

13. An object identification system as set forth in claim 12, wherein said body is a bowl and said plurality of objects are balls.

14. An inductive coupled object identification system, comprising:

a plurality of objects, each object including an object resonance circuit corresponding thereto and having a predetermined object resonance frequency unique to that object;

a base unit comprising a pluralit of inductive coupling circuits and an oscillator circuit;

said base unit including an elongated post having a longitudinal axis;

said plurality of inductive coupling circuits being defined by a plurality of inductive coupling coils arranged in spaced relation with respect to each other along the extent of said elongated post about the longitudinal axis thereof;

computer processor means for providing strobe pulses to initiate an intermittent start signal;

a start circuit operably connected to said computer processor means and responsive to the strobe pulses from said computer processor means for generating the itnermittent start signal as a series of pulses at preselected intervals as controlled by said computer processor means and corresponding to a predetermined frequency;

at least one of said plurality of inductive coupling coils being selected to receive a start signal from said start circuit to activate said at least one inductive coupling coil;

said plurality of objects being annular objects, each of said annular objects being adapted to be received by said elongated post in encircling relationship with respect thereto so as to be in a predetermined proximate relationship with respect to at least one of said plurality of inductive coupling coils when activated;

the object resonance circuit of an annular object being inductively coupled to the start signal and rsonating at the predetermined object resonance frequency unique to the annular object in response to the placement of that particular annular object in the predetermined proximate relationship with respect to said selected inductive coupling coil when activated;

said oscillator circuit being responsive to a resonance condition in an inductively coupled object resonance circuit to provide an oscillation signal corresponding in frequency to the object resonance frequency as an output; and a frequency discrimination circuit connected to said oscillator circuit and receiving the oscillation signal output therefrom for determining the frequency of the oscillation signal, thereby determining the object resonance frequency and identifying the particular annular object from the plurality of annular objects which was placed in the predetermined proximate relationship with rsepect to the selected inductive coupling coil when activated.

15. An object identification system as set forth in claim 14, wherein said base unit further includes a base coil selection circuit for sequentially selecting respective ones of said plurality of inductive coupling coils to receive the start signal to activate the selected one of said plurality of inductive coupling coils in a predetermined sequene.

16. An object identification system as set forth in claim 15, wherein said base coil selection circuit comprises a multiplexer operably connected to said plurality of inductive coupling coils for cyclically selecting respective ones of said plurality of inductive coupling coils to receive the start signal in the predetermined sequence.

17. An object identification system as set forth in claim 16, wherein the output of said frequency discrimination circuit and the status of said multiplexer are received by said computer processor means for identifying the particular annular object and the particular one of said plurality of inductive coupling coils to which the particular annular object as received by said elongated post in encircling relationship therewith was placed in the predetermined proximate relationship.

* * * * *